March 1, 1932.  F. C. BIGGERT, JR  1,847,232
MOTOR CONTROL SYSTEM
Filed Nov. 19, 1930   2 Sheets-Sheet 1
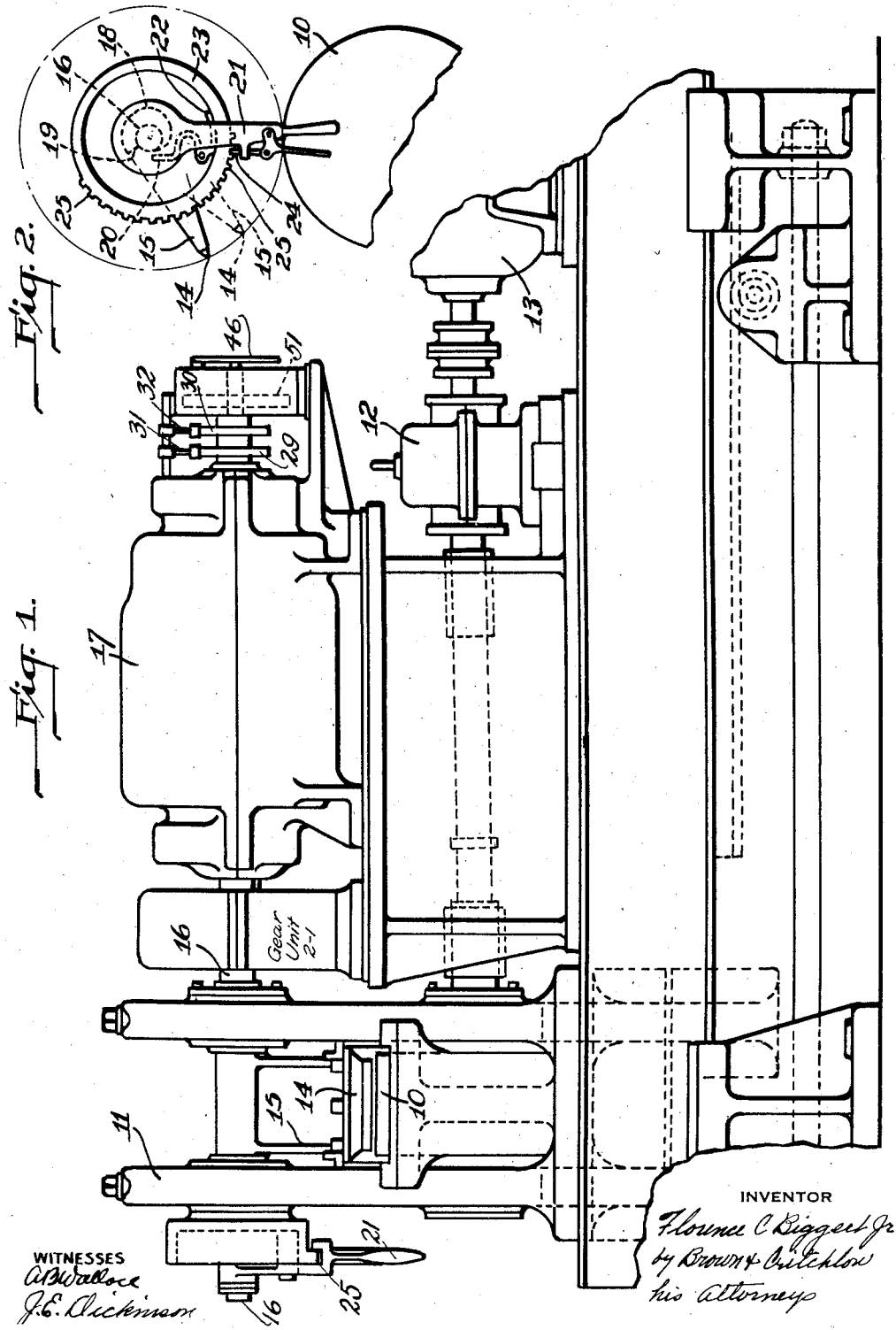
INVENTOR
Florence C Biggert Jr.
by Brown & Critchlow
his Attorneys March 1, 1932.  F. C. BIGGERT, JR  1,847,232
MOTOR CONTROL SYSTEM
Filed Nov. 19, 1930  2 Sheets-Sheet 2
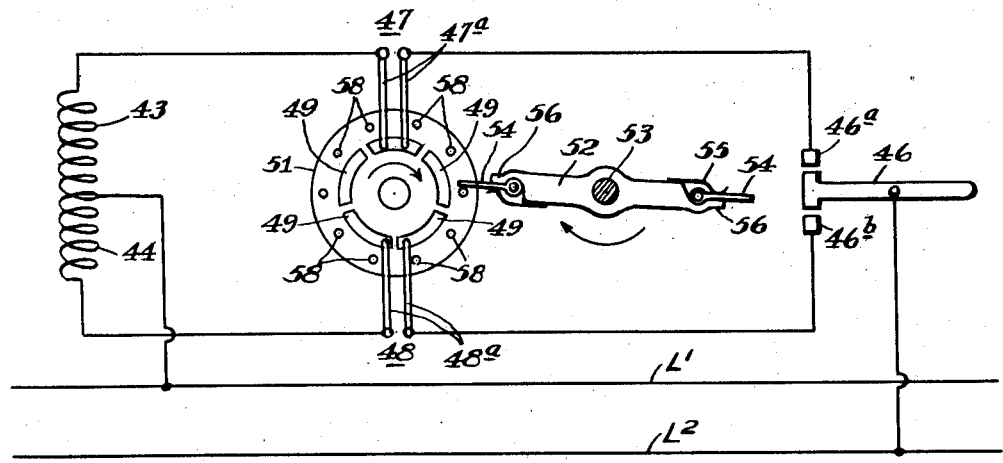
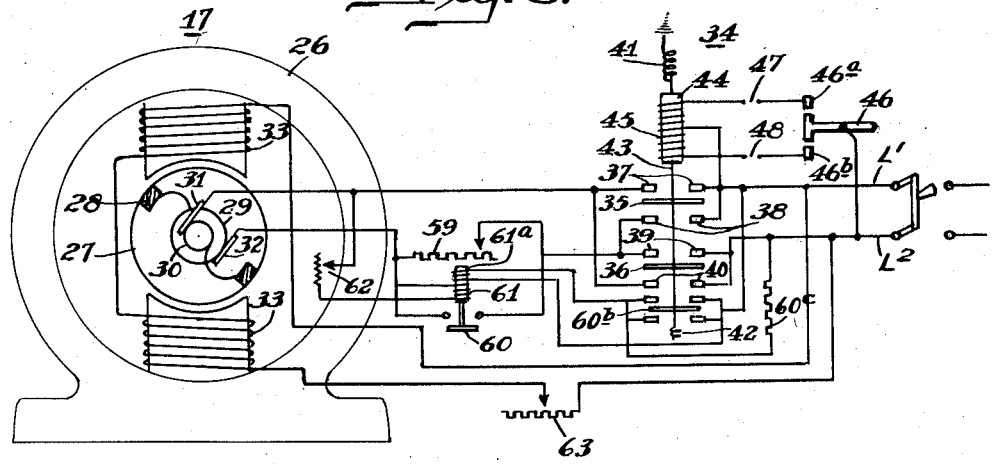
WITNESSES
INVENTOR Patented Mar. 1, 1932

1,847,232

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

MOTOR CONTROL SYSTEM

Application filed November 19, 1930. Serial No. 496,668.

This invention relates to driving gear for intermittently operable devices such as flying shears and mechanisms of that character and more particularly to a special form of electrical motor and control system adapted for such use.

The primary object of the invention is to provide an improved drive of this nature which is simple and sturdy of construction, dependable in operation, and while not necessarily so limited in its use, is particularly adapted for operating flying shears of the type illustrated and described in a copending application, Serial No. 402,382, filed October 25, 1929, by John A. Smitmans and the present inventor.

A more particular object, however, is to provide a novel form of electric motor especially designed for use with apparatus of the above noted character, and in combination therewith a simple dependable control system adapted to automatically control the operation of the motor in such a way as to reduce to a minimum both the mechanical and electrical shocks commonly encountered in such installations.

These and various other objects, as well as various other novel features and advantages of the invention, will become more apparent when the following detailed description is read in conjunction with the accompanying drawings, in which:

Fig. 1 is a side elevational view of a flying shear equipped with a drive constructed in accordance with the invention;

Fig. 2 is an end view of a portion of the shearing machine illustrated in Fig. 1 showing the cutting blade in full lines in its cutting position, and in dotted lines in its stationary position;

Fig. 3 is a schematic diagram of a drive motor and control system embodying the invention; and Fig. 4 a schematic view of a circuit interrupting mechanism employed to control the operation of the reversing switch utilized for reversing the current in the armature circuit of the blade motor.

Referring to Fig. 1 of the drawings, a particular form of flying shear, intended for cutting strip into predetermined lengths as it issues from a rolling mill, is selected for illustrating the invention, and comprises an anvil roll 10 which is rotatably mounted in bearings carried by a stand 11. This roll is driven by a variable speed electric motor 13, hereinafter referred to as an anvil motor, which is connected to the roll by means of a suitable reduction gearing 12, and is adapted to drive it at peripheral speeds according with the linear speed of the strip which as will be appreciated, usually varies with different sizes of stock.

For cutting the strip, a blade 14 is employed being arranged to work against the anvil roll 10 and make cutting engagement with the strip as the latter passes over the roll. This blade is mounted in a holder 15 which is secured to a shaft 16 that is, in turn, rotatably mounted in bearings carried by stand 11 and driven by a motor 17. When it is desired to make a cut, shaft 16 driven by motor 17 is rotated in a clockwise direction, as viewed in Fig. 2, sufficiently to move the blade over the anvil roll and return it to its original stationary position as also indicated in Fig. 2 by the dotted lines.

For determining the position of rest or the starting position of the blade, the base of the blade holder 15, or other suitable member on shaft 16, is provided with a snail cam 18, see Fig. 2, at the outer end of which there is formed a shoulder 19. This shoulder is adapted to engage, in a counterclockwise direction, the outer end of a dog 20, which is pivotally mounted on a lever 21. The inner end of this dog is a tail piece 22 which engages the inner surface of a collar 23, this being in turn fixedly secured to stand 11 in concentric relation with shaft 16. To provide for adjusting the dog 20 so as to stop the blade in different positions, lever 21 is equipped with a manually operable latch 24 which is arranged to engage in one or another of a series of teeth 25 formed on the outer periphery of the collar 23. When the dog is properly positioned, as shown in Fig. 2, the blade is held at rest at a sufficient distance from the surface of the anvil roll to permit the strip to pass freely between the blade and roll. It will also be noted that when the blade holder is rotated in a clockwise direction the dog 20 does not interfere with its movement but rides freely upon the snail cam 18 snapping over the outer end thereof at the completion of each revolution, placing it in a position to stop any counter-clockwise movement of the blade beyond the point determined by the relative positions of the dog 20 and shoulder 19.

In accordance with the customary practice adhered to in the past, standard types of electric motors have been employed to perform the functions required of blade motor 17, and the operation of such motors has been controlled by rather complicated combinations of resistors, relays, contactors and other control apparatus, all of which add to the expense of such installations as well as increase the possibility of operating troubles.

In accordance with this invention a special form of motor is provided for such use which is not only simpler of construction but presents a much simpler and less difficult control problem and is susceptible of operation with considerably less operating troubles than the motors heretofore employed.

As viewed in Fig. 3, motor 17 which is constructed in accordance with the invention comprises chiefly a double pole stator 26 and a rotary armature 27 upon which a single coil 28 is mounted. The terminals of this coil are connected to a pair of collector rings 29 and 30. Bearing on these are a pair of brushes 31 and 32, respectively, which in turn are connected to line contactors $L^1$ and $L^2$. The field for the motor is provided by field windings 33 which are shown here as being connected directly to the source of current supply although they may be otherwise excited.

In accordance with such an arrangement when direct current is supplied to both the field and armature windings the armature, instead of rotating continuously, revolves only sufficiently to reach a position of magnetic equilibrium. In doing so, however, it usually oscillates, due to the inertia of the moving parts, with a decreasing amplitude until the position of equilibrium is reached. The amount of movement the armature makes in this manner, not considering that occasioned by the inertia of the moving parts when the current is reversed, is 180 electrical degrees, which, in the case of a two-pole machine such as illustrated here, is also 180 mechanical degrees or, in other words, one-half of a complete revolution. This movement of the armature is of course repeated each time the currents in either the armature or field windings is reversed. To adapt such a motor to the driving of blade 14, armature 27 is coupled to shaft 16 by means of a 1 to 2 ratio gear unit, whereby the shaft is caused to rotate through a complete revolution for each one-half revolution of the motor. The blade is thus caused to pass over the anvil roll each time the current in the armature or field windings is reversed.

For controlling the operation of motor 17 so that the shear may be operated intermittently as desired, the following equipment is employed. For reversing the current to the armature a simple reversing switch 34 is provided which, as illustrated in Fig. 3, comprises a pair of bridging members 35 and 36 carried by a stem 43. Cooperating with these bridge members are two different sets 37, 38 and 39 and 40, respectively, of contact elements which are connected in the power circuit of line conductors $L_1$ and $L_2$. As illustrated in the drawings, line conductor $L_1$ is connected to the set of contact elements 37 and to one each of the contact elements 38 and 40, and line conductor $L_2$ to the set of elements 39 and to one of each of the sets 38 and 40. Hence, when the bridging members 35 and 36 are actuated to their upper positions brush 31 is connected to line conductor $L_2$, and brush 32 to line conductor $L_2$, and when to their lower positions the connections are reversed.

For holding the bridging members 35 and 36 in a neutral position between the contact elements when the switch is not in use, a pair of springs 41 and 42 are attached to the opposite ends of the stem 43, and, for actuating switch 34, a pair of oppositely excited solenoid coils 44 and 45 are employed and arranged in a circuit whereby their energization is controlled by a manually operated switch 46 together with a pair of flag switches 47 and 48, which latter are operated in accordance with the movements of the cutting blade.

As illustrated in Fig 4, the flag switches 47 and 48, each comprises a pair of sliding contact members (47a and 48a) which are connected in circuit relation, respectively, with the contact elements 46a and 46b of switch 46 and the opposite ends of the coils 43 and 44 with their free ends spaced from each other and arranged to ride upon the surface of a plurality of uniformly spaced commutator-like bridging members 49 mounted on a supporting disk 51 and insulated from one another. For actuating disk 51 a double armed member 52 is secured to the end of a shaft 53 on which armature 27 is mounted, the disk 51 and switch members 47a and 48a being associated therewith in the manner indicated in Fig. 1 at the outer end of motor 17 adjacent to the collector rings 31 and 32. On the end of each of the arms of the member 52 there is pivotally mounted at latch 54 which is held in place by a spring 55 and prevented from movement in one direction by a lug 56. Each time the motor is energized to move the cutting blade over the anvil roll these arms are moved through a net angular distance of 180°, and with each cut one of them passes its latch 54 over a portion of disk 51. And, as will be noted, a plurality of uniformly spaced pins 58 are arranged about the outer edge of disk 51. Consequently, as the latch 54 passes over this disk 51 on the cutting stroke it is deflected downward against the action of spring 55 without moving disk 51 which is mounted for movement in one direction only. When the direction of motion of armature 27 is reversed after it over-travels the point of magnetic equilibrium as referred to above, arm 52 moves latch 54 back over the edge of disk 51 and in this back movement engages one of the pins 58 and moves disk 51. The pins 58, members 49 and the contact members 47a and 48a are so designed and spaced that each time one of the arms of member 52 moves in a counter-clockwise direction over disk 51 it moves disk 51 and the contact members 49 sufficiently to break the circuit through one of the flag switches and close it through the other. Hence switch 34 is caused to operate in a different direction each time it is energized, and is energized by throwing switch 46 in the direction of which ever of the switches 47 or 48 is closed.

In accordance with the foregoing, when it is desired to make a cut, switch 46 is moved to one or the other of its circuit closing positions depending upon which one of the flag switches 47 or 48 is closed. When so closed reversing switch 34 is moved accordingly, causing the bridging members 35 and 36 to be moved into a corresponding circuit making position, and the armature coil 28 of the motor is thereby energized. With the energization of coil 28, the armature 27 moves from its position of rest determined by dog 20 carrying blade 14 over anvil roll 10. Due to the inertia of the moving parts as referred to hereinbefore, when the motor is energized armature 27 and blade 14 are carried beyond the point of magnetic equilibrium of the armature and to a point beyond the normal position of rest determined by dog 20. To slacken the speed of the armature in its return movement after such over-travel so that it will not move against the dog 20 with a shock, a resistor 59 is inserted in the armature circuit. For accomplishing this a magnetic type circuit interrupter 60 is employed, although any other suitable means for accomplishing this end could be used. As shown in Fig. 3, the bridging member of this interrupter is connected in a circuit extending in shunt relation about resistor 59, while for effecting its operation an actuating coil 61 is connected across the terminals of the coil 28 and a demagnetizing coil 61a is connected through a two-way bridge 60b on switch 34 to the supply lines, a resistor 60c being connected to the switch 34 in a manner to shunt coil 61a when the switch is energized. Due to such an arrangement the interrupter 60, which is normally held closed, is adapted to fall open as soon as the counter-electromotive force in the armature circuit of the motor falls to zero, which occurs at approximately the point of physical reversal of the armature. For adjusting the breaker so that it will open the shunt circuit at different times, an adjustable resistor 62 may be connected in series circuit relation with coil 61, and the coil so designed that, with the insertion of resistor 59 in the armature circuit, there will be insufficient voltage present across the armature to produce sufficient pull in the coil to reclose the breaker. Hence, when once inserted resistor 59 remains in the armature circuit until the motor is brought to rest. Furthermore, during the latter portion of the reverse movement of the armature the arm of the flag switch actuating member 52 passing over disk 51 moves the disk sufficiently to open the flag switch, maintaining switch 34 closed and closes the other flag switch. This opening of the first-mentioned flag switch causes the reversing switch 34 to open and deenergizes the motor. Consequently, no magnetic forces are acting upon the armature when the shoulder 19 on cam 18 engages dog 20.

To vary the peripheral speed of the blade so that at the time of cutting it will accord with the speed of the strip, either the lever 21 may be adjusted to vary the accelerating stroke of the armature, or a variable resistor 63 arranged in the motor field circuit may be adjusted to change the strength of the field.

In order to explain the operation of the invention, assume that the anvil roll is running at a speed corresponding to the speed of the strip and that a piece of strip is passing over it. Also, assume that the motor is adjusted to attain the proper cutting speed. With these conditions prevailing, and disk 51 in the position illustrated to produce a cut, if switch 46 is moved to the left, it will cause reversing switch 34 to move to its upper position and close the armature circuit setting the armature in motion. Upon being energized the armature will accelerate until the neutral magnetic position of coil 28 is reached. During such movement, blade 14 will move over the anvil roll and cut the strip. Also, dog 20 will ride over cam 18 and the flag switch operating mechanism will move in synchronism with the blade. During the latter part of the forward movement of the armature, dog 20 will snap over shoulder 19 placing it in a position to stop the blade when its movement is reversed, also latch 54 after moving over one of the pins 58 will be in a position ready to engage the pin as the member 52 is reversed. When the point of reversal of armature 28 is reached as stated above contactor 60 falls open, and shortly thereafter on the reverse movement of the armature the disk 51 is moved sufficiently by member 52 to open flag switch 47 and close flag switch 48. This opening of the switch occurs shortly before the shoulder 19 reaches the stop dog 20, so that the motor is deenergized when the blade comes to rest. Switch 48 in closing places that switch in the proper condition for insuring the correct energization of coil 28 on the next succeeding cutting operation.

Among its chief advantages the invention provides an exceedingly simple form of motor, eliminates the use of a commutator which is usually a considerable source of trouble, and in addition employs only a very simple and dependable combination of control equipment; the life of which is materially enhanced by reason of the fact that in the operation of the motor it is not necessary to interrupt any electrical circuits when it is carrying a heavy current, as no circuits, in accordance with this invention, are opened during a period of heavy load.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:

1. In combination with a work element, a direct current motor operably coupled thereto comprising a stator and a wound rotor, slip rings mounted on said rotor and connected to the terminals of the rotor windings, a source of direct current connected to said slip rings, means for normally stopping the rotor at a position of rest displaced from its position of magnetic equilibrium, means for reversing the flow of current to the slip rings, automatic means for damping the oscillations of the rotor each time it is moved by a reversal of current, and means adapted to automatically interrupt the current supply to said slip rings after the rotor has moved a net total of 180 electrical degrees with each reversal of current supplied to it.

2. In combination with a work element, a direct current motor operably coupled thereto comprising a wound rotor, a pair of slip rings mounted on said rotor, a source of direct current supply connected to said slip rings, a reversing switch for reversing the flow of current to said rings, and means for automatically opening said switch after each movement of the rotor corresponding to a movement of 180 electrical degrees of said rotor winding, and means for insuring a reversal of the current each time the reversing switch is actuated.

3. In combination with a work element, a direct current motor operably coupled thereto comprising a wound rotor, a pair of slip rings mounted on said rotor and connected to said rotor windings, a source of direct current supply connected to said slip rings, means for reversing the flow of current to said rotor windings, automatic means for interrupting said current supply after each 180 degrees of electrical movement of said rotor, and means for insuring unidirectional movement of the rotor for each reversal of current supplied to it.

4. The combination with a rotary shear, of a direct current motor, comprising a wound rotor, means for positively coupling said rotor to the shear in such a way that the shear is rotated through a complete revolution each time the rotor is moved a distance corresponding to 180 electrical degrees, a pair of slip rings mounted on said rotor and connected to the terminal of said rotor windings, a source of direct current supply connected to said slip rings, means for normally holding the shear in an inoperative position, means for interrupting the source of current supply to the slip rings after each rotation of the shear, means for insuring a reversal of current flow to the slip rings each time the motor is energized, and means operable at the will of an operator for energizing the motor.

5. The combination with a rotary shear, of a direct current motor comprising a wound rotor, means positively coupling said rotor to the shear in such a way that the shear is rotated through a complete revolution each time the rotor is actuated through an angular distance of 180 electrical degrees, a pair of slip rings mounted on said rotor and connected to said rotor windings, a source of direct current supply connected to said slip rings, and means for varying the cutting speed of the shear.

6. The combination with a rotary shear, of a double poled direct current motor comprising a wound rotor equipped with a single coil of magnetic windings, a pair of slip rings mounted on the rotor and connected to said windings, a source of direct current supply connected to said slip rings, means coupling said rotor to said shear in such a way that each half revolution of said rotor produces a complete revolution of the shear, means for interrupting the flow of current to the slip rings after each complete rotation of the shear, means for reversing the flow of current to the motor for each successive operation of the shear, and means for stopping said shear in a selected inoperative position after each operation which is such as to insure movement of the rotor and shear in the same direction each time the current through the rotor is reversed.

In testimony whereof, I sign my name.

FLORENCE C. BIGGERT, Jr.